United States Patent [19]

Brown et al.

[11] Patent Number: 5,186,729
[45] Date of Patent: Feb. 16, 1993

[54] METHOD OF MAKING IN-SITU WHISKER REINFORCED GLASS CERAMIC

[75] Inventors: Jesse J. Brown, Christiansburg; Deidre A. Hirschfeld, Elliston; K. H. Lee, Blacksburg, all of Va.

[73] Assignees: Center for Innovative Technology, Herndon; VPI & SU, Blacksburg, both of Va.

[21] Appl. No.: 692,214

[22] Filed: Apr. 26, 1991

[51] Int. Cl.$^5$ ............................................. C03C 10/12
[52] U.S. Cl. ........................................... 65/33; 501/7
[58] Field of Search ................................. 65/33; 501/7

[56] References Cited

U.S. PATENT DOCUMENTS

| | | | |
|---|---|---|---|
| 3,549,394 | 12/1970 | Perrotta | 65/33 X |
| 3,582,371 | 6/1971 | Bruno et al. | 65/33 X |
| 3,804,608 | 4/1974 | Gaskell et al. | 65/33 |
| 3,839,001 | 10/1974 | Adams et al. | 65/33 |
| 3,940,255 | 2/1976 | Harrington et al. | 65/33 |
| 4,285,728 | 8/1981 | Babcock et al. | 501/7 |

OTHER PUBLICATIONS

Microstructural Characterization and Fracture Toughness of Cordierite—$ZrO_2$ Glass-Ceramics, McCoy et al., J. Am. Ceram. Soc., 71 [8] 673–77.
Effect of Crystallites on Subcritical Crack Growth and Strain-Rate Sensitivity of Strength of Cordierite Glass-Ceramics, Baskaran et al., J. Am Ceram. Soc., 68 [3] 112–19, 1985.
Crack Deflection Processes—I. Theory, Faber et al., Acta metall. 31 [4] 565–76, 1983.
Crack Deflection Propcesses—II. Experiment, Faber et al., Acta metall. 31 [4] 577–84, 1983.
Microstructure and Kinetics of Crystallization of $MgO$-$Al_2$-$SiO_2$ Glass-Ceramics Zdaniewski, J. Am. Ceram. Soc., 61:5-6, 1978.
Crystallization of $MgO$-$Al_2O_3$-$ZrO_2$ Glasses, McCoy et al., J. Am. Ceram. Soc., 69 [3] 292–96 (1986).
Effect of Crystallites on Surface Damage and Fracture Behavior of a Glass Ceramic, Morena et al., J. Am. Ceram. Soc., 56: 673 (1983).
Role of Crack Size in the Bi-Modal Static Fatigue Failure of a Cordierite Glass and Glass-Ceramic, Baskaran et al., J. of Material Science 22:871-76 1987.
Preparation and Properties of Cordierite-Based Glass-Ceramic Containing Precipitated $ZrO_2$., Mussler, J. Am Ceram. Soc., 64:1459-62 (1985).
Strength and Microstructure in Lithium Disilicate Glass-Ceramics, Borom et al. J. Am. Soc., 58:9-10, (1975).

Primary Examiner—Robert L. Lindsay
Attorney, Agent, or Firm—Whitham & Marhoefer

[57] ABSTRACT

A heat processing procedure is used to create reinforcing whiskers of $TiO_2$ in glass-ceramic materials in the LAS and MAS family. The heat processing procedure has particular application in creating $TiO_2$ in-situ in a modified $\beta$-eucryptite system.

10 Claims, No Drawings

METHOD OF MAKING IN-SITU WHISKER REINFORCED GLASS CERAMIC

DESCRIPTION

Background of the Invention

1. Field of the Invention

The present invention generally relates to glass-ceramic materials and, more particularly, to a process of providing in-situ reinforcement of glass-ceramic materials with whiskers of titanium oxide ($TiO_2$).

2. Description of the Prior Art

Glass ceramic materials have been used in widely diverse fields of application including domestic range tops, cooking ware, telescope mirrors, and heat engines. Two well known glass-ceramic systems are MgO—$Al_2O_3$—$nSiO_2$ (MAS) and $Li_2O$—$Al_2O_3$—$nSiO_2$ (LAS). The MAS system is commonly called a cordierite system. A well known subcategory of LAS is $\beta$-eucryptite which is LAS where n equals 2. In LAS materials, when n is less than 4, the material exhibits a large negative thermal expansion with increasing temperature. As discussed in U.S. Pat. No. 3,549,394 to Perotta, the degree of thermal expansion of $\beta$-eucryptite can be decreased to near zero by introducing $AlPO_4$ into the system. Specifically, Perotta teaches a glass ceramic system having the composition $Li_{1-x}AlP_xSi_{1-x}O_4$ where x ranges between 0.05 and 0.65.

It is well known that ceramics which are reinforced with fibers or other structures can have increased strength and toughness characteristics. Reinforcement can be achieved by adding fibers to the matrix material during processing; however, for some systems, in situ reinforcement of the ceramic matrix is preferable.

SUMMARY OF THE INVENTION

It is therefore an object of the present invention to provide a method of reinforcing glass-ceramic materials in situ with whiskers of $TiO_2$.

It is another object of this invention to provide a modified $\beta$-eucryptite ceramic reinforced in situ with $TiO_2$.

It is yet another object of this invention to provide a method of strengthening microcracked glass-ceramic structures via recrystallization.

According to the invention, a powdered ceramic material is mixed with a suitable amount of powdered $TiO_2$ (a nucleating agent) and heated to high temperatures for a period of time. Subsequently, the glass melt is quenched in water and then treated one of two ways. First, the glass can be ground into a fine powder. Grinding serves the purpose of providing many exposed surfaces from which crystals can grow. The glass powder is then formed into a compact for further processing. Second, grinding of the glass may be avoided altogether since the microcracking which occurs during quenching will in itself provide exposed surfaces for crystal growth. If the second method is to be used, the glass formed in the first mixing and heating step should be in the shape of the final product desired.

After the powder compact or the glass with microcracks is formed, it is subjected to a heat treatment process. During the process, the compact or material is subjected to prolonged heating at a temperature sufficient to cause recrystallization of the matrix ceramic and of the $TiO_2$ to form acicular grains or "whiskers" in-situ throughout the matrix material which are large enough to provide a glass-ceramic with increased strength and toughness. For example, "whiskers" of $TiO_2$ form at or above 1000° C., but not at 900° C. In addition, if $ZrO_2$ is used as the nucleating agent in the glass instead of $TiO_2$, the "whiskers" of $ZrO_2$ produced are significantly smaller than the $TiO_2$ "whiskers".

DETAILED DESCRIPTION OF A PREFERRED EMBODIMENT OF THE INVENTION

The invention is particularly concerned with forming in-situ acicular grains or "whiskers" of $TiO_2$ within a glass-ceramic matrix which are of sufficient size and quality to provide the glass-ceramic with improved strength and toughness properties. The types of glass-ceramic matrix materials contemplated in this invention are LAS, MAS, $AlPO_4$ modified $\beta$-eucryptite as described by Perotta, a chemically modified $\beta$-eucryptite having the composition $Li_{0.41}Mg_{0.35}AlP_{0.52}Si_{0.48}O_4$ which was developed at Virginia Polytechnic Institute and State University, and other similar glass-ceramics. The chemically modified $\beta$-eucryptite, $Li_{0.41}Mg_{0.35}AlP_{0.52}Si_{0.48}O_4$, is a solid having approximately 48 mol percent $LiAlSO_4$, where 20 mol percent of the lithium has been replaced by magnesium, and 52 mol percent $AlPO_4$. The chemically modified $\beta$-eucryptite exhibits very low thermal expansion (e.g., $-7 \times 10^{-7}/°$ C.) and has low thermal expansion anisotropy in comparison to pure $\beta$-eucryptite and should have improved thermal shock resistance. The invention is primarily concerned with processes for reinforcing glass-ceramic materials in-situ with $TiO_2$ whiskers. The processes will be discussed below by example with the chemically modified $\beta$-eucryptite system; however, it should be understood that the processes can be practiced in LAS, MAS, $ALPO_4$ modified LAS systems, as well as other glass-ceramic systems.

$Li_{0.41}Mg_{0.35}AlP_{0.52}Si_{0.48}O_4$ powder is obtained by solid state reaction. Amounts of reagent grade $Al(OH)_3 \cdot nH_2O$, silicic acid, $NH_4H_2PO_4$, $MgSO_4$, and $Li_2CO_3$ are calculated to produce one mole of $Li_{0.41}Mg_{0.35}AlP_{0.52}Si_{0.48}O_4$. Included in this calculation is the weight loss factor for silicic acid and $Al(OH)_3 \cdot nH_2O$. For example, a composition of 11.574 g or $Li_2CO_3$, 1.612 g of $MgSO_4$, 50.788 g $Al(OH)_3 \cdot nH_2O$, 45.652 g of $NH_4 \cdot H_2PO_4$, and 24.078 g of silicic acid would be suitable. The mixture is ground three times with acetone in a glass mortar and pestle then allowed to dry completely. After drying, the mixture of raw materials undergoes a series of heat treatments. The mixture is first heated at 200° C. for 2 hours, then ground three times with acetone in a mortar and pestle. The heating and grinding are repeated at 400° C., 600° C., and 800° C. This early heat treatment gradually drives off water and carbon dioxide such that the oxides are thoroughly mixed. Finally, the mixture is heat treated at 1070° C. for 100 hours to produce the desired phase. X-ray diffraction shows that this processing method produces the modified $\beta$-eucryptite solid $Li_{0.41}Mg_{0.35}AlP_{0.52}Si_{0.48}O_4$.

To achieve in-situ formation of $TiO_2$ whiskers in the glass-ceramic, a ground powder of ceramic is mixed with a suitable amount (e.g, 6–12 percent) of powderized $TiO_2$ and placed in an alumina crucible and heated at 1620° C. for 2–3 hour. After heating, the glass melt is quenched in water. Quenching causes microfractures to form in the glass product (during quenching, some ceramic may be formed, but the product from quenching is primarily a glass). The glass product can either be directly processed further or ground to a fine powder before further processing.

The objective is to have a number of exposed surfaces for promoting crystal growth. Grinding the glass product into a powder provides a large number of exposed surfaces for whisker growth. The microfractures themselves in the glass product do provide exposed surfaces; however, if grinding is to be avoided, the glass product formed during the first heating step (combining the ceramic with $TiO_2$ at 1620° C.) must be very close to the desired shape of the end product. An advantage of the grinding step is that the powderized glass composition can be formed into a desired shape and then further heat processed, making the composition more easily handled. If grinding is to be performed, the glass product can be ground with a mortar and pestle and then milled to a fine powder. The glass powder is then mixed with acetone and poured into a mold. During sedimentation, acetone is drained from the bottom part of the mold to leave a glass compact. The compact is then carefully removed from the mold and is ready for further processing.

The compact or glass product with microfractures is then subjected to a controlled heat treatment process for recrystallizing the $TiO_2$ and ceramic such that whiskers of $TiO_2$ are formed in-situ within a glass-ceramic matrix. First, the compact or glass product is heated to 680° C. and held for 5 hours. Then, the compact or glass product is given a recrystallization treatment at high temperature (e.g., 1100° C.) for 50 hours. For a powder compact made from the chemically modified $\beta$-eucryptite and $TiO_2$, heating the compact to only 900° C. resulted in only the $\beta$-eucryptite phase being obtained. However, whisker formation was achieved at a temperature of 1000° C. A typical recrystallized glass sample which had been heated at 1100° C. for 50 hours yields $TiO_2$ whiskers within the modified $\beta$-eucryptite where the $\beta$-eucryptite has a grain size of five microns and where the whiskers have a diameter of one micron and an aspect ratio of 15-30. Electron microprobe analysis indicated that these acicular grains or "whiskers" are $TiO_2$ (the nucleating agent). $TiO_2$ is completely dissolved in the glass melt, and nucleates upon reheating, and grows randomly as whiskers when the temperature is above 1000° C.

The presence of the $TiO_2$ whiskers in the chemically modified $\beta$-eucryptite significantly improves the modulus of rupture (MOR). Modified $\beta$-eucryptite can be slip cast as described above without $TiO_2$ so that it would not contain whiskers. Three point bending tests have been conducted on the modified $\beta$-eucryptite, with and without whisker reinforcement, and confirm that the MOR values are increased two to three times when whiskers are present. When $ZrO_2$ was used as the nucleating agent instead of $TiO_2$ in this procedure, the $ZrO_2$ whiskers were much smaller and probably would not provide the strengthening and toughness enhancement which $TiO_2$ whiskers provide.

While the invention has been described in terms of its preferred embodiment where a particular glass-ceramic system has whiskers of $TiO_2$ formed in-situ by heat processing, those skilled in the art will recognize that the invention can be practiced with modification within the spirit and scope of the appended claims.

Having thus described my invention, what we claim as new and desire to secure by Letters Patent is as follows:

1. A method for the in-situ formation of $TiO_2$ whiskers with a glass-ceramic matrix material, comprising the steps of:
    combining six to twelve weight percent of $TiO_2$ with a ceramic material selected from the group consisting of $Li_2O \cdot Al_2O_3 \cdot nSiO_2$ where n ranges between 1 and 4, $MgO \cdot Al_2O_3 \cdot nSiO_2$ where n ranges between 1 and 4, $Li_{1-x}AlP_xSi_{1-x}O_4$ where x ranges between 0.05 and 0.65, and $Li_xMg_xAlP_xSi_{1-x}O_4$ where x ranges between 0.05 and 0.65;
    forming a glass of the mixture of said $TiO_2$ and said ceramic material;
    creating exposed surfaces in said glass; and
    heating said glass with said exposed surfaces to a temperature and for a period of time sufficient to cause in-situ formation of $TiO_2$ whiskers within a glass-ceramic matrix material of a size sufficient to reinforce said glass-ceramic matrix material.

2. A method as recited in claim 1 wherein said temperature and said period of time sufficient to cause in-situ formation of whiskers within said glass-ceramic matrix material are greater than 1000° C. and greater than fifty hours, respectively.

3. A method as recited in claim 1 wherein said step of creating said exposed surfaces in said glass is accomplished by quenching said glass after said forming step such that microfractures are created in said glass.

4. A method as recited in claim 1 wherein said step of creating said exposed surfaces in said glass is accomplished by powderizing said glass after said forming step.

5. A method for the in-situ formation of whiskers with a glass-ceramic matrix material, comprising the steps of:
    combining an amount of a nucleating agent selected from the group consisting of $TiO_2$ and $ZrO_2$ with a ceramic material selected from the group consisting of $Li_2O \cdot Al_2O_3 \cdot nSiO_2$ where n ranges between 1 and 4, $MgO \cdot Al_2O_3 \cdot nSiO_2$ where n ranges between 1 and 4, $Li_{1-x}AlP_xSi_{1-x}O_4$ where x ranges between 0.05 and 0.65, and $Li_xMg_xAlP_xSi_{1-x}O_4$, said amount of said nucleating agent being sufficient to form nuclei for ceramic and whisker growth but not to devitrify a glass made from said ceramic material;
    forming said glass of said ceramic material;
    creating exposed surfaces in said glass; and
    heating said glass with said exposed surfaces to a temperature and for a period of time sufficient to cause in-situ formation of whiskers of said nucleating agent within a glass-ceramic matrix material of a size sufficient to reinforce said glass-ceramic matrix material.

6. A method as recited in claim 5 wherein said temperature and said period of time sufficient to cause in-situ formation of whiskers within said glass-ceramic matrix material are greater than 1000° C. and greater than fifty hours, respectively.

7. A method as recited in claim 5 wherein said step of creating said exposed surfaces in said glass is accomplished by quenching said glass after said forming step such that microfractures are created in said glass.

8. A method as recited in claim 5 wherein said step of creating said exposed surfaces in said glass is accomplished by pulverizing said glass after said forming step.

9. A method as recited in claim 1 wherein said ceramic material is $Li_{0.41}Mg_{0.35}AlP_{0.52}Si_{0.48}O_4$.

10. A method as recited in claim 5 wherein said ceramic material is $Li_{0.41}Mg_{0.35}AlP_{0.52}Si_{0.48}O_4$.

* * * * *